(12) United States Patent
Cagliari

(10) Patent No.: US 8,001,705 B2
(45) Date of Patent: Aug. 23, 2011

(54) SPORTS BOOT WITH DECORATION

(75) Inventor: Peter Cagliari, Montebelluna/TV (IT)

(73) Assignee: Lange International S.A., Fribourg (CH)

( * ) Notice: Subject to any disclaimer, the term of this patent is extended or adjusted under 35 U.S.C. 154(b) by 908 days.

(21) Appl. No.: 11/075,203

(22) Filed: Mar. 8, 2005

(65) Prior Publication Data
US 2005/0198871 A1    Sep. 15, 2005

(30) Foreign Application Priority Data

Mar. 11, 2004  (CH) ........................................ 0419/04
Jun. 23, 2004  (EP) ..................................... 04014655

(51) Int. Cl.
    A43B 5/04         (2006.01)
(52) U.S. Cl. ........................................ 36/117.1; 36/136
(58) Field of Classification Search ................ 36/117.1, 36/132, 136, 115
    See application file for complete search history.

(56) References Cited

U.S. PATENT DOCUMENTS

| | | | |
|---|---|---|---|
| 1,932,658 A | 10/1933 | Goodfriend | |
| 2,607,130 A | 8/1952 | Pearson | |
| 3,319,360 A * | 5/1967 | Nadler | ................................. 36/4 |
| 3,568,339 A | 3/1971 | Masao Hara et al. | |
| 3,613,271 A | 10/1971 | Geller | |
| 4,096,650 A | 6/1978 | Seidel | |
| 4,516,337 A * | 5/1985 | Adamik | .......................... 36/136 |
| 5,032,139 A | 7/1991 | Recher et al. | |
| 5,813,148 A * | 9/1998 | Guerra | ............................ 36/137 |
| 5,839,211 A * | 11/1998 | Pallera | ............................ 36/136 |
| 6,723,479 B2 * | 4/2004 | Van De Witte et al. | .......... 430/20 |
| 6,768,654 B2 * | 7/2004 | Arnold et al. | .................. 361/818 |
| 6,775,932 B2 * | 8/2004 | Lin | ................................ 36/136 |
| 7,219,900 B2 * | 5/2007 | Meibock | .................... 280/11.27 |
| 2003/0084595 A1 | 5/2003 | Weiss | |
| 2004/0103562 A1 * | 6/2004 | Chaigne | ....................... 36/117.1 |
| 2004/0168357 A1 | 9/2004 | Meibock | |

FOREIGN PATENT DOCUMENTS

| | | |
|---|---|---|
| DE | 931 6803.9 | 3/1993 |
| EP | 0 722 843 A | 7/1996 |
| EP | 1 444 908 A | 8/2004 |
| FR | 2 847 433 A | 5/2004 |

* cited by examiner

Primary Examiner — Jila M Mohandesi

(74) Attorney, Agent, or Firm — Frommer Lawrence & Haug LLP; Ronald R. Santucci

(57) ABSTRACT

The sports boot (1) comprises a part composed of two injected materials and a decoration (8) arranged between two layers of the boot, a transparent layer covering it.

19 Claims, 3 Drawing Sheets

SPORTS BOOT WITH DECORATION

This application claims priority benefits from Swiss Patent Application No. 0419/04 filed Mar. 11, 2004 and European Patent Application No. 04014655.7 filed Jun. 23, 2004.

BACKGROUND OF THE INVENTION

The invention relates to all or part of a sports boot comprising a decoration and is particularly suited to boots for a board for gliding, such as a ski or snowboard, or a skating boot, which are used in abrasive environments and are subject to significant stresses when used. In addition, it also relates to the method for manufacturing such a boot.

DESCRIPTION OF THE PRIOR ART

Gliding sports involve conflicting stresses in terms of boot structure. On the one hand, they have to have rigid elements allowing the user precisely to guide the gliding equipment and to feel the response of the equipment to these stresses. On the other hand, they have to have flexible elements providing comfort, as homogenously as possible distributing the contact pressure around the user's feet and legs. To this end, a prior-art solution consists in manufacturing the boot in accordance with a bi-injection process, which allows the complementary, combined use of two materials with different mechanical characteristics, the thickness and stiffness of each material, for example, being provided on the boot as a function of the mechanical constraints and comfort constraints. This solution also optimizes the quantity of material needed at any point of the boot and optimizes the overall weight of the boot. This structure in the form of two bi-injected materials is a good response to the requirements of stiffness and comfort.

Previous boots of the prior art, however, have modest decoration, which is often limited to the effect generated by the association of the two different colors of the two materials mentioned above, owing to the following constraints:

- the boot is designed for an abrasive environment and for a sports use involving significant stresses suffered by its structure. In the case of skiing or snowboarding, the boot is also subject to accidental impacts caused by the edges. These adverse external influences make it difficult to arrange durable decorations on the boot;
- furthermore, the boot has a complex, non-planar surface, which does not favor its decoration;
- the boot also has a complex, costly structure owing to the mechanical and comfort constraints mentioned in the previous paragraph, and it is not economically possible to envisage increasing its cost significantly for an additional constraint of an aesthetic nature;
- the boot must also have a minimal weight in order to optimize its performance and its cost. Decorative solutions involving an increase in the weight of the boot would thus be unsuitable.

SUMMARY OF THE INVENTION

A first object of the present invention consists in proposing a sports boot comprising a decoration, the latter possibly being large, of any shape, and possibly comprising a significant number of colors, and being resistant to the constraints imposed by the use of the sports boot and suited to the complex form of the boot's surface.

A second object of the present invention consists in proposing a sports boot with decoration that remains suited to the conflicting constraints of stiffness and comfort imposed by practicing the sport.

A third object of the present invention consists in proposing a sports boot, with decoration, whose weight remains minimal.

A fourth object of the present invention consists in proposing a sports boot, with decoration, the method of manufacture of which is simple and the extra cost of which remains negligible.

According to the concept of the invention, the sports boot with decoration is manufactured on the basis of the prior-art bi-injection process, and it is envisaged providing a decoration between the two layers of the boot, the surface layer being placed over the decoration in order to protect it and being transparent in order to reveal it.

More precisely, the invention relates to a sports boot or boot part comprising a part of shell or cuff type composed of two layers of materials, the combination of which fulfills a dual function of stiffness and comfort of the boot part, which comprises a decoration arranged between the two layers, and wherein the second layer is transparent in order to reveal the decoration and covers it in order to protect it from adverse external influences.

According to a first variant embodiment, the decoration may be produced by any means of marking the first layer of the boot part.

According to a second variant embodiment, the decoration may be produced on a support, this support then being arranged on the first layer of the boot part.

To that end, a lightweight adhesive means may be arranged between the support of the decoration and the first layer, or the support may have adhesive properties, or the boot first layer may have an adhesive means produced by lugs, for example.

The support may be the actual adhesive means or be a sticker or be of the decal type.

The sports boot may be a ski boot, the boot part being the shell, for example made from polyurethane, and the decoration being arranged on the lateral parts of the shell.

Furthermore, the decoration may be of an alphanumeric and/or four-color type. It may also contain information allowing the sports boot to be managed, by means of a barcode for example.

The invention also relates to the method for manufacturing a sports boot, which comprises the manufacture of part of the boot of shell or cuff type in two distinct material-injection steps, the combination of which fulfills a dual function of stiffness and comfort, which comprises an intermediate step consisting in arranging a decoration on the surface of the part obtained after the first injection, this decoration then being covered by a transparent material at the time of the second injection.

The intermediate step may comprise a step consisting in positioning a support comprising the decoration on the surface of the first part with the aid of an adhesive means.

The intermediate step may also comprise a step consisting in removing a support sheet from the decoration in order to obtain the adhesive effect of the adhesive means, or in heating the support in order to obtain its adhesive effect.

The intermediate step may consist in a step of gluing on a sticker, the decorative support being a sticker.

BRIEF DESCRIPTION OF THE DRAWINGS

These objects, characteristics and advantages of the present invention will be set forth in detail in the following description of a particular embodiment given in a non-limiting manner in connection with the appended figures, in which.

DESCRIPTION OF THE PREFERRED EMBODIMENTS

Figure 1:
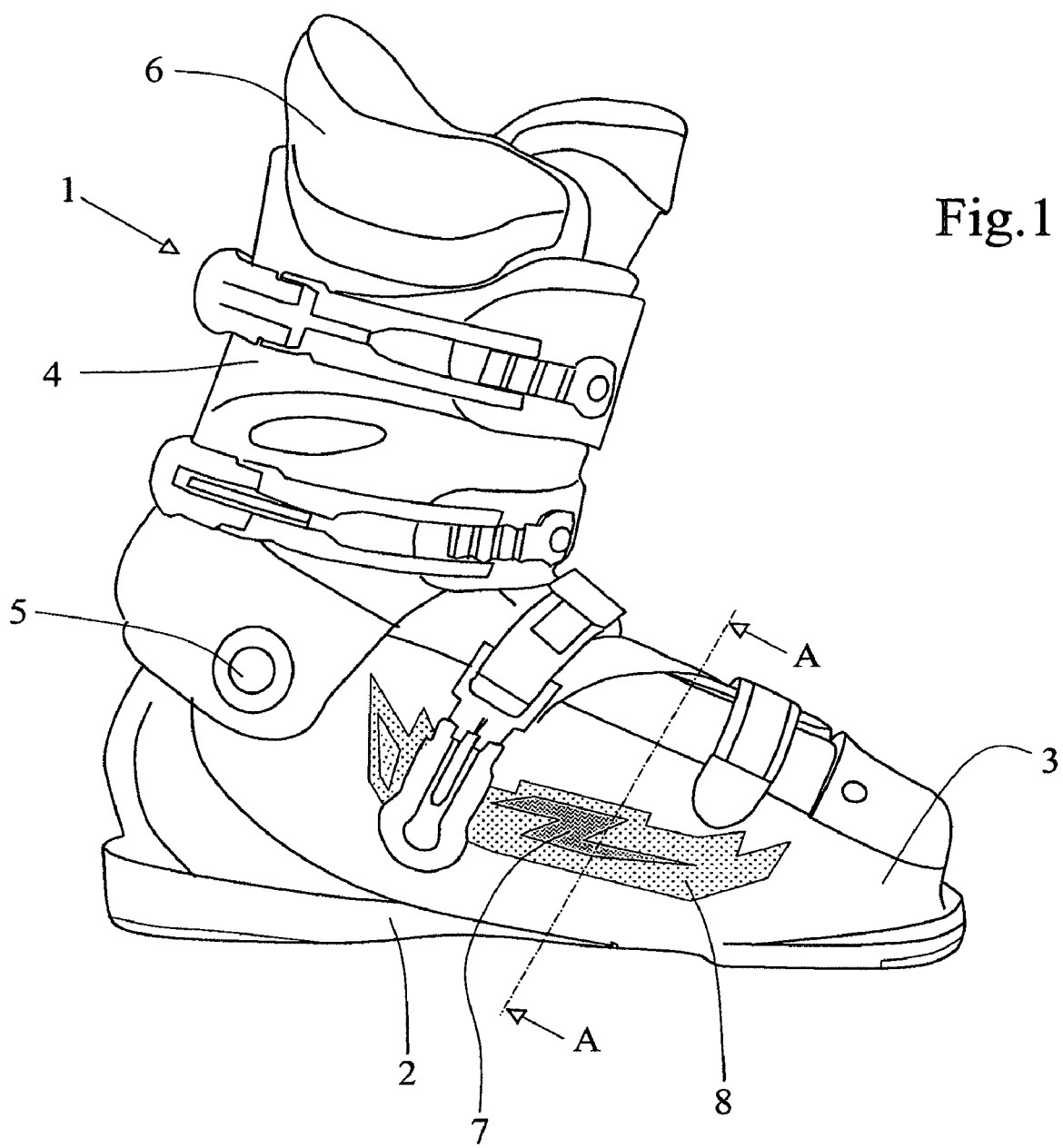
FIG. 1 is a perspective view of a boot according to the invention.

The embodiment described below with reference to FIGS. 1 and 2 relates to a ski boot 1 consisting essentially of a sole 2, a shell 3, and a cuff 4 articulated on the shell 3 in the ankle region at a point 5. This shell 3 and this cuff 4 receive a comfort liner 6. The shell includes a decoration 8.

Figure 2:
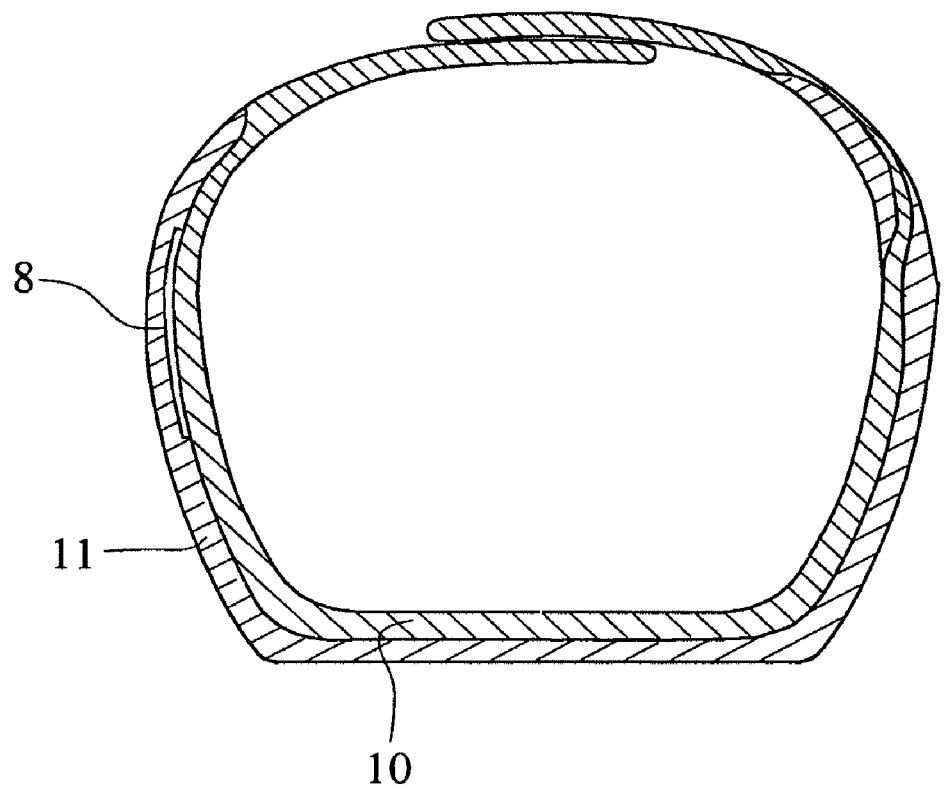
FIG. 2 is a sectional view along A-A of the boot of FIG. 1.

FIG. 2 shows, in section, the structure of the shell 3, which contains a first material, for example a relatively flexible polyurethane, forming a first layer 10, and a second, transparent material, for example a stiffer polyurethane, forming a second layer 11. The decoration 8 is arranged between the two layers 10 and 11 and can be seen from the outside by virtue of the transparency of the layer 11.

The invention also relates to the method for manufacturing the ski boot 1, which is obtained by means of the following essential steps:

formation of the first layer 10 by a first polyurethane-injection step;

arrangement of the decoration 8 on the surface of the first layer 10;

formation of the second layer 11 by means of a second transparent-polyurethane-injection step, said polyurethane totally covering the decoration 8.

The decoration 8 may be produced on the surface of the first layer 10 by hot marking, by screen printing, pad printing, sublimation techniques, or by any prior-art marking solution.

In a variant embodiment, the decoration 8 may be arranged on a support 7 placed directly onto the surface of the first layer 10 using an adhesive means.

In this variant embodiment, the term "adhesive means" is used broadly to mean any means allowing temporary or definitive adhesion of the support 7 to the layer 10. This means may have a very slight, temporary adhesive effect, as it is used only to hold the layer 10 support 7 for a very limited period until the second, transparent layer 11 that covers the support 7 is produced shortly after its adhesion and fulfills the function of holding the support, then rendering the role of the adhesive means optional, while protecting the decoration against adverse external influences. Thus, this adhesive means may consist of:

a means added between the support 7 and the layer 10, like a glue; or a means arising from the actual properties of the support 7 itself, either obtained directly owing to its nature or obtained by being subjected to particular conditions, such as during hot welding, the use of ultrasound or the generation of static electricity; or a means originating from the layer 10 itself, such as lugs provided during its injection allowing the securing and adhesion of the decorative support.

The support 7 of the decoration 8 is selected so as to be thin and flexible, from paper, plastic or a natural or synthetic bonding element, for example, so as to be able to match the non-planar surface of the first layer 10 of the shell 3. The support 7 may be a foil, an ink or a polyurethane varnish, or the same material as that of the shell of the boot, which has the advantage of facilitating recycling of the boot while allowing its complete and simple adhesion to the first layer 10 by means of fusion by a heating means. The support 7 may also be metallic, such as an aluminum sheet.

The decoration may be obtained very simply by means of printing on blank sticker paper from a computer printer, or by any existing marking method. It may also consist of a cutout giving a particular form to the support. It may also be obtained by means of chemical treatments, such as the anodization of an aluminum sheet or the production of recesses and/or engravings in an aluminum sheet, for example.

Lastly, the support 7 of decoration 8 may be a conventional sticker paper, in which case it will be composed of a first face containing the decoration and a second face comprising the adhesive means covered by a protective sheet that will be removed just prior to arrangement of the support on the first layer of the boot.

The support 7 may also be a polyurethane varnish covering a marking on a temporary support sheet, which is removed when the support is deposited in the cold or hot state on the first layer of the boot.

Figure 3:
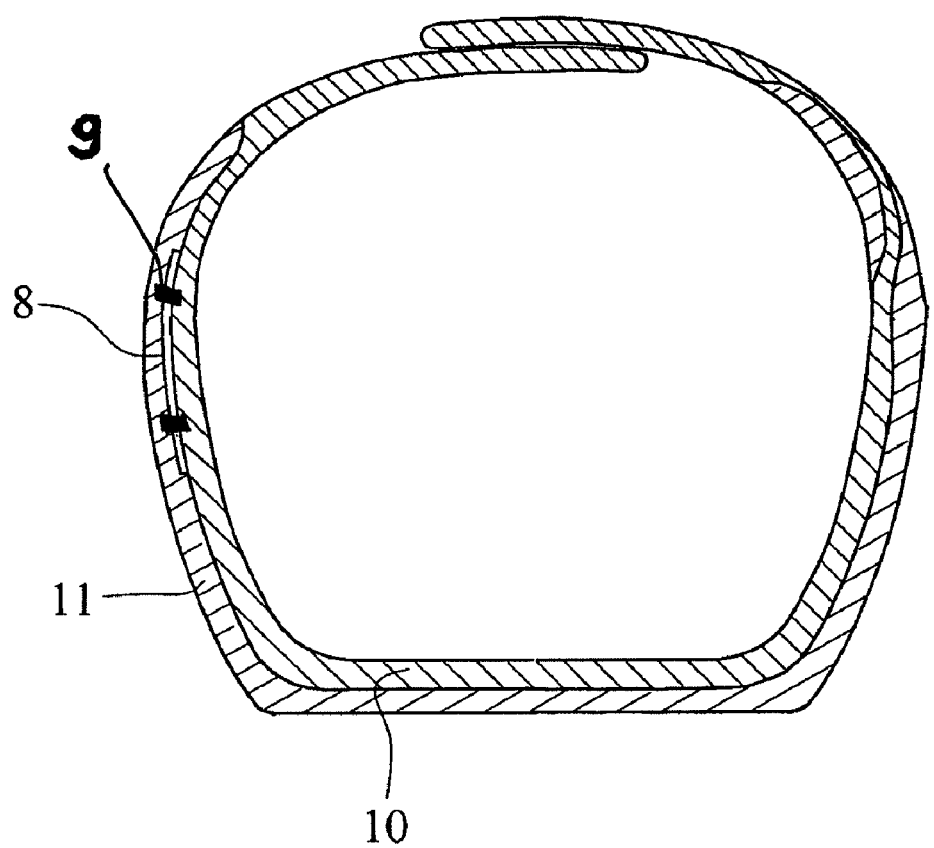
FIG. 3 is a sectional view along A-A of the boot of FIG. 1, according to one embodiment of the present invention.

In a variant embodiment, the adhesive means consists of at least one stud (9) of the first layer (10) of the boot in order to attach the support (7), as shown in FIG. 3, for example.

In a variant embodiment, the decoration may be arranged by using the decal method, which will thus consist in applying the support to the first layer of the boot, removing the sheet from on top of the decoration.

This variant embodiment consisting of a decoration previously arranged on a support makes it possible to achieve the following advantages:

the method for manufacturing a boot is greatly simplified as it suffices to arrange the decoration using an adhesive means between the two injection steps;

as the decoration is produced on a flexible, simple support, it is possible to select any complex forms for this support and, consequently, for the decoration. Moreover, the decoration may cover a large surface of complex form of the boot as its flexibility enables it to adapt itself to the surface onto which it is placed. It may also comprise any type of complex alphanumeric- or four-color-type printing, including colors, markings, holograms, etc. As it may be produced very simply, the method for manufacturing the boot is suitable for small manufacturing runs.

In the above variant embodiments, the decoration was arranged on the lateral part of the boot shell. However, it could be placed on another surface of the shell 3 or on the cuff 4.

The material used for the second layer may be transparent or, equally, translucent.

Symmetrically, the material of the first layer may also be transparent, which can optionally create one aesthetic effect inside the boot and a different aesthetic effect from the outside. This first layer also fulfills an additional function of protecting the decoration from possible adverse influences originating inside the boot.

The two layers mentioned may be made from polyurethane of a stiffness between 50 and 66 ShD, or from any other material customarily used to produce a boot part, and combined in order to fulfill the comfort and stiffness requirements. In a variant embodiment, it is possible to use a material compatible with decorative solutions using sublimation for the first layer.

The decoration may be more than a simple decoration and may contain information that rental outlets can use for managing sports boots, for example. Thus, the decoration may be of the bar-code type, or any equivalent type, in order to indicate a boot identification number. It may also allow identification of the rental outlet that owns the sports boot. This may enable the outlet to automate the boot-rental procedure by means of the step of rapidly identifying the boot, and to identify the boots that belong to it simply and with certainty.

Lastly, the solution ably achieves the objects mentioned above and offers the following advantages:

- as the decoration is arranged between two layers of the boot, it is held in place and protected from adverse external influences;
- the invention requires no specific, supplementary protection to be added to the shell in order to protect the decoration: it is enough to incorporate a decoration between two customary layers of the boot structure. Thus, the two layers mentioned fulfill their customary principal function of comfort and stiffness of the boot. According to the invention, they fulfill a third function of holding and a fourth function of protecting the decoration, without the need for modifying these layers, apart from the transparency of the second layer;
- given the above explanations, the increase in the weight and cost of the boot according to the invention as compared to a boot without decoration is limited simply to the weight and to the cost of the added decoration, which is negligible.

The invention claimed is:

1. A ski, snowboard or skating boot (1) comprising an inner comfort liner (6) and a shell (3) or cuff (4) comprising:
    a first layer (10) of injected plastic material, wherein the first layer is formed by a first injection step;
    a support layer (7), wherein the support layer is thin and flexible, and is selected from the group consisting of paper, plastic or a natural or synthetic, bonding element, foil, ink, polyurethane varnish, metallic foil, sticker paper, and adhesive means;
    a decoration (8) arranged on the support layer, the support layer with the decoration being placed directly onto a surface of the first layer; and
    a second layer (11) of injected plastic material, wherein the second layer is injected on top of the first layer thereby holding the decoration between the two layers, wherein the second layer is transparent in order to reveal the decoration, and the second layer covers the support layer and the decoration in order to protect it from adverse external influences, and wherein the combination of the first and second layers fulfills a dual function of stiffness and comfort of the boot.

2. The boot (1) as claimed in claim 1, wherein the support (7) is the adhesive means.

3. The boot (1) as claimed in claim 1, wherein the support (7) is the sheet, varnish or polyurethane ink.

4. The boot (1) as claimed in claim 1, wherein the support (7) is the metallic foil.

5. The boot (1) as claimed in claim 1, wherein the adhesive means consists of at least one stud of the first layer (10) of the boot in order to attach the support (7).

6. The boot (1) as claimed in claim 1, wherein the support (7) of decoration (8) is a sticker.

7. The boot (1) as claimed in claim 1, wherein the decoration support (7) is of the decal type.

8. The boot (1) as claimed in claim 1, wherein the two layers of the boot part are made from polyurethane.

9. The boot (1) as claimed in claim 1, which boot is a ski boot, the boot part being the shell (3) and the decoration (8) being arranged on the lateral parts of the shell.

10. The boot as claimed in claim 1, wherein the decoration (8) is of the alphanumeric and/or four-color type.

11. The boot as claimed in claim 1, wherein the decoration (8) contains information for managing the boot.

12. The boot as claimed in claim 11, wherein the decoration includes a bar-code-type part for containing the information.

13. A method for manufacturing a sports boot as claimed in claim 1, which comprises the manufacture of part of the boot of shell or cuff type in two distinct material-injection steps, the combination of which fulfills a dual function of stiffness and comfort, which comprises an intermediate step consisting in producing a decoration (8) on the surface of the part obtained after the first injection.

14. The method for manufacturing a sports boot as claimed in claim 13, wherein the intermediate step consists in providing a support (7), containing a decoration (8), with the aid of an adhesive means, on the surface of the part obtained after the first injection, this decoration (8) then being covered by a transparent material during the second injection.

15. The method for manufacturing a sports boot as claimed in claim 14, wherein the intermediate step comprises a step consisting in heating the support (7) in order to obtain adhesion of the support (7), the support (7) then being the adhesive means.

16. The method for manufacturing a sports boot as claimed in claim 14, wherein the intermediate step comprises a step consisting in removing a sheet from the support (7) of decoration (8) in order to obtain the adhesive effect of the adhesive means.

17. The method for manufacturing a sports boot as claimed in claim 16, wherein the intermediate step consists of a step of gluing on a sticker, the support (7) of decoration (8) being a sticker.

18. The boot (1) as claimed in claim 1, wherein the decoration is arranged on the surface of the first layer.

19. The boot (1) as claimed in claim 1, wherein the second layer (11) comes in contact with the decoration (8) or its support layer (7) and in contact with the first layer (10) around the decoration (8) or its support layer (7).

* * * * *